United States Patent
Rajagopal et al.

(10) Patent No.: US 9,349,365 B2
(45) Date of Patent: May 24, 2016

(54) VOICE BASED AUTOMATION TESTING FOR HANDS FREE MODULE

(71) Applicant: Accenture Global Services Limited, Dublin (IE)

(72) Inventors: Vidya Rajagopal, Bangalore (IN); Divya Kilari Chandrababu naidu, Bangalore (IN); Marin Grace, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 323 days.

(21) Appl. No.: 13/829,677

(22) Filed: Mar. 14, 2013

(65) Prior Publication Data

US 2014/0278439 A1    Sep. 18, 2014

(30) Foreign Application Priority Data

Mar. 14, 2013 (IN) .......................... 1080/CHE/2013

(51) Int. Cl.
*G10L 25/00* (2013.01)
*G10L 21/00* (2013.01)
*G10L 15/01* (2013.01)
*H04M 1/24* (2006.01)
(Continued)

(52) U.S. Cl.
CPC ................ *G10L 15/01* (2013.01); *H04M 1/24* (2013.01); *G10L 15/22* (2013.01); *H04M 1/6033* (2013.01); *H04M 2250/74* (2013.01)

(58) Field of Classification Search
CPC ......... G10L 15/22; G10L 13/00; G10L 15/01; G10L 15/06; G10L 15/265; G10L 19/00; H04M 1/271; H04M 1/24; H04M 1/72522; H04M 2250/74; H04R 2225/55; B60D 1/36
See application file for complete search history.

(56) References Cited

U.S. PATENT DOCUMENTS 5,715,369 A * 2/1998 Spoltman et al. ............. 704/270
5,862,401 A * 1/1999 Barclay, Jr. ........ G05B 19/0421
700/4

(Continued)

FOREIGN PATENT DOCUMENTS

EP     2190239 A2 *  5/2010 ............ H04W 24/06
EP     1 936 607 B1    7/2012
(Continued)

OTHER PUBLICATIONS

"GL Announces Testing Solutions for IVR—Interactive Voice Response Systems", pp. 1-3; Oct. 26, 2012; http://news.yahoo.com/gl-announces-testing-solutions-ivr-interactive-voice-response-085525884.html.

(Continued)

*Primary Examiner* — Michael Ortiz Sanchez
(74) *Attorney, Agent, or Firm* — Brinks Gilson & Lione

(57) ABSTRACT

An electronic control unit (ECU) of a hands-free module may be tested by an automated voice based testing tool in a first device. The tool reads test input data from an Excel input file. The tool generates simulated audible voice commands in a specified language, accent, pitch, volume or speed to test the hands-free module. The voice commands are transmitted via a speaker to a hands-free module microphone. The hands-free ECU is coupled to a CAN bus and the tool receives CAN bus information corresponding to hands-free module operations. The tool outputs test verdict information and/or CAN bus message logs as text in an Excel file.

20 Claims, 5 Drawing Sheets

(51) Int. Cl.
*G10L 15/22* (2006.01)
*H04M 1/60* (2006.01)

(56) References Cited

U.S. PATENT DOCUMENTS

| | | | | |
|---|---|---|---|---|
| 6,091,802 | A * | 7/2000 | Smith et al. | 379/10.03 |
| 6,285,924 | B1 * | 9/2001 | Okamoto | G01C 21/3629 701/1 |
| 6,421,793 | B1 * | 7/2002 | Lester et al. | 714/37 |
| 6,622,121 | B1 * | 9/2003 | Crepy et al. | 704/243 |
| 6,728,612 | B1 * | 4/2004 | Carver et al. | 701/34.3 |
| 6,847,316 | B1 * | 1/2005 | Keller | H04L 69/18 341/106 |
| 6,978,198 | B2 * | 12/2005 | Shi | G06F 8/60 701/33.4 |
| 7,487,084 | B2 | 2/2009 | Aaron et al. | |
| 7,529,545 | B2 * | 5/2009 | Rader | H04R 25/70 455/268 |
| 7,562,019 | B2 | 7/2009 | Cohen et al. | |
| 7,684,988 | B2 | 3/2010 | Barquilla | |
| 7,917,260 | B2 * | 3/2011 | Ubik et al. | 701/32.8 |
| 7,930,683 | B2 * | 4/2011 | Li | 717/124 |
| 8,260,617 | B2 * | 9/2012 | Dhanakshirur et al. | 704/270 |
| 2002/0077819 | A1 * | 6/2002 | Girardo | 704/260 |
| 2003/0187639 | A1 * | 10/2003 | Mills | G10L 15/01 704/231 |
| 2003/0236672 | A1 * | 12/2003 | Aaron et al. | 704/277 |
| 2004/0078104 | A1 * | 4/2004 | Nguyen | H03G 3/3078 700/94 |
| 2005/0197836 | A1 * | 9/2005 | Cohen et al. | 704/251 |
| 2005/0278569 | A1 * | 12/2005 | Srinivasan | G06F 11/0742 714/25 |
| 2006/0085187 | A1 * | 4/2006 | Barquilla | 704/243 |
| 2007/0135187 | A1 * | 6/2007 | Kreiner et al. | 455/575.2 |
| 2007/0220494 | A1 * | 9/2007 | Spooner | G06F 8/30 717/130 |
| 2009/0199160 | A1 * | 8/2009 | Vaitheeswaran | G06F 11/3414 717/124 |
| 2009/0271189 | A1 * | 10/2009 | Agapi | G10L 15/01 704/233 |
| 2010/0256864 | A1 * | 10/2010 | Ying | H04L 12/2697 701/31.4 |
| 2012/0032945 | A1 | 2/2012 | Dare et al. | |
| 2012/0128134 | A1 | 5/2012 | Pappas et al. | |
| 2012/0221893 | A1 | 8/2012 | Bai et al. | |
| 2013/0152047 | A1 | 6/2013 | Moorthi et al. | |
| 2013/0179164 | A1 * | 7/2013 | Dennis | 704/234 |
| 2013/0201316 | A1 * | 8/2013 | Binder | H04L 67/12 348/77 |
| 2014/0012587 | A1 * | 1/2014 | Park | H04W 12/06 704/275 |

FOREIGN PATENT DOCUMENTS

| | | |
|---|---|---|
| KR | 20030002999 A | 1/2003 |
| WO | WO 2005/070092 A2 | 8/2005 |
| WO | WO2010/088085 | 8/2010 |

OTHER PUBLICATIONS

"Speech Recognition Solutions", p. 1; Nov. 2, 2012; http://www.nuance.com/for-individuals/by-solution/speech-recognition/index.htm.

"Compilation of unification grammars with compositional semantics to speech recognition packages", pp. 1-2; 2002; http://dl.acm.org/citation.cfm?id=1072228.1072323&coll=DL&dl=GUIDE&CFID=191339550&CFTOKEN=36164743.

"Speech recognition in the human-computer interface"; pp. 1-2; Jul. 2003; http://dl.acm.org/citation.cfm?id=871490.871493&coll=DL&dl=GUIDE&CFID=191339550&CFTOKEN=36164743.

Extended European Search Report issued in European application serial No. 14000928.3 on Jan. 13, 2015, 7 pages.

Extended European Search Report issued in European application serial No. 14000927.5 on Oct. 29, 2014, 6 pages.

Mark Jewell and Steven Bird, AmFax Ltd. and David A. Hall, National Instruments, "Parallel Processing Techniques Reduce Cellular Test Time" pp. 1-11, Nov. 2007 http://ww.evaluationegineering.com/articles/20711/parallel-processing-techniques-reduce-celluar-test-time.php.

"AmFax PXI-Based Bluetooth Measurement Suite"; National Instruments, pp. 1, Nov. 9, 2012, http://sine.ni.com/nipdfgenerator/nipdfgenerator?pageURL=http://www.ni.com/white-paper/3857/en&clientAppName=dz&dotsPerPixel=&dotsPerPoint.

WIPRO Bite—Bluetooth Qualification Test Systems, pp. 1-2; Wipro Technologies; 2010; http://www.wipro.com/Documents/resource-center/library/wireless_test_lab_bluetoothv5.pdf.

"Harald: A nano-framework for testing and monitoring Bluetooth adapters and devices on Linux" pp. 1-32, Technetra, Jan. 2009; http://www.technetra.com/2009/01/.

"Agilent Technologies E1852A Bluetooth Test Set"; Agilent Technologies, pp. 1-4; May 31, 2001; http://cp.literature.agilent.com/litweb/pdf/5988-1978EN.pdf.

"Using KTimetracker"; KDE.org, pp. 1-3; Nov. 28, 2012 http://docs.kde.org/stable/en/kdepim/ktimetracker/interfaces.html.

"Bluetooth Profile Tuning Suite" pp. 1-2; Nov. 28, 2012; http://developer.bluetooth.org/DevelopmentResources/Pages/TOOLS.aspx.

Canadian Office Action issued in Canadian Application No. 2,846,316, dated Jun. 3, 2015, pp. 1-4.

* cited by examiner

VOICE BASED AUTOMATION TESTING FOR HANDS FREE MODULE

BACKGROUND OF THE INVENTION

1. Technical Field

This disclosure relates to voice based testing of an electronic control unit (ECU). In particular, this disclosure relates to voice-based testing of electronic equipment, such as hands-free systems in motor vehicles.

2. Related Art

Hands-free systems, for example, voice based systems, may respond to audible commands and perform specified actions without manual or touch control by a user. Some hands-free systems may work with one or more other devices to complete an action such as making a phone call, changing a radio station, interacting with a navigation system or interacting with other telematics services. In some systems, a hands-free module may communicate with another device via a communications bus, such as a control area network (CAN) bus. For example, a hands-free module installed in a vehicle may respond to a user's voice command to change a radio station and may transmit a message over a control area network to a radio and/or a display screen to change the station. In another example, a hands-free module may respond to a user's voice command, such as "call Smith." The hands-free module may communicate via Bluetooth technology or another wireless or wired technology, with a mobile phone to initiate a phone call. While the phone is being controlled by the hands-free module, a microphone, speaker and/or display unit of the hands-free module may function in place of such interfaces of the mobile phone. In instances when the hands-free module is installed in an automobile, the microphone may be located in a rear view mirror, or the display and speaker unit may be installed in a dashboard, for example. Other controls may also interact with the hands-free module, for example, manual controls in a steering wheel or associated with a display unit may be utilized to activate the hands-free module. As voice based systems become more sophisticated and numerous, improved automated testing techniques are desirable.

SUMMARY

An automated testing tool hosted in a first computer device may test operations of an electronic control unit (ECU) in a hands-free module second device. The automated testing tool may read test input data from text data in an input file. The automated testing tool may generate one or more simulated audible voice commands for the hands-free module testing. The hands-free second device may be communicatively coupled to a control area network (CAN) bus. The automated testing tool may receive information from the CAN bus, where the CAN bus information may correspond to operations of the hands-free second device. The automated testing tool may output text in file including verdict information corresponding to the testing. Moreover, the output file may include all or a portion of the information from the CAN bus, such as, message logs corresponding to the testing.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
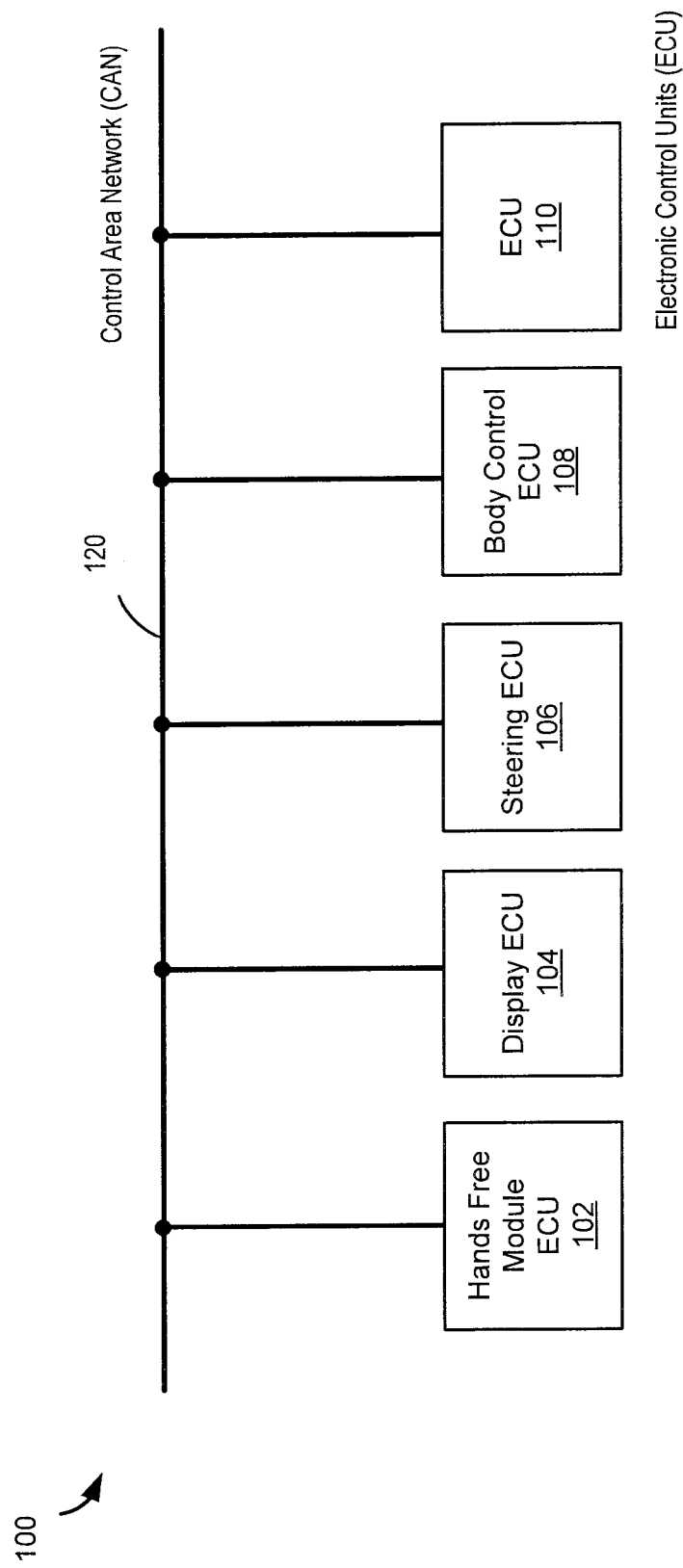
FIG. 1 is a representative block diagram of a control area network bus and a plurality of electronic control units communicatively coupled by the control area network bus.

An automated test solution may communicate with an electronic control unit (ECU) and instruct the ECU to perform one or more actions in order to perform a test of the ECU. Responses to the instructions may include communication by the ECU over a control area network (CAN) bus. The responses may be logged by the automated test system and the system may determine success or failure of the test. In some systems, input to the automated test solution may be provided by an Excel spreadsheet which may be read by the automated test solution. Test results may be provided by the automated test solution in an Excel spread sheet.

In a first aspect, one embodiment of the invention is a method for testing a hands-free device by an automated testing tool hosted by a first device. Test input may be read from text in an input file and utilized for testing operations of a hands-free second device. The hands-free second device may be communicatively coupled to a control area network (CAN) bus. One or more simulated audible voice commands may be generated for testing operations of the hands-free second device, based on the read test input. The automated testing tool may read information from the CAN bus. The CAN bus information may correspond to the operations of the hands-free second device which may be responsive to the generated simulated audible voice commands. The automated testing tool may output text in an output file comprising one or both of verdict information corresponding to testing the operations of the hands-free second device and all or a portion of the information received from the CAN bus. The text in the test input file may indicate the one or more simulated audible voice commands and one or more expected responses by the hands-free second device. One or more simulated audible voice commands for the testing operations of the hands-free second device may be generated by the automated testing tool based on text to speech logic and may comprise one or more of a specified language, pronunciation, regional accent, volume, pitch and speed. The automated testing tool may compare expected responses from the text in the read test input file to the information received from the CAN bus to determine the verdict information. Furthermore, the first device and the second device may be communicatively coupled via a first mobile phone and a second mobile phone. The automated testing tool may be operable to receive the information from the CAN bus corresponding to a call initiated in the first mobile phone to the second mobile phone by the generated one or more simulated audible voice commands, or a call initiated automatically by the automated testing tool in the second mobile phone to the first mobile phone based on the read test input. Generating one or more simulated audible voice commands may comprise transmitting the simulated audible voice commands from the first device via a speaker positioned to be sensed by a microphone communicatively coupled to the hands-free second device. The hands-free second device may comprise an electronic control unit (ECU) for a vehicle. The operations of the hands-free second device may include communicating messages onto a CAN bus for communication to a display unit, after one or more of receiving an audible voice command via an audio port, reorganizing the voice command and comparing the voice command to a programmed voice grammar. Moreover, the hands-free second device may communicate messages onto the CAN bus for communication to the display unit after receiving one or more of a command via a wireless interface, a command via an optical interface, and a command via a wire line interface. The first device and the hands free second device may be communicatively coupled by a control area network (CAN) message processor. The automated testing tool may be operable to, one or both of, enable audible voice command operations in the hands-free second device by transmitting a command to the hands-free second device via the CAN message processor, and receive the CAN bus information from the hands-free second device via the CAN message processor.

In a second aspect, another embodiment of the invention is a system for testing a hands-free device. The system may comprise one or more circuits or processors in a first device. The one or more circuits or processors may be operable to read test input from text in an input file for testing operations of a hands-free second device. The hands-free second device may be communicatively coupled to a control area network (CAN) bus. One or more simulated audible voice commands may be generated for testing operations of the hands-free second device based on the read test input. The automated testing tool may read information from the CAN bus. The CAN bus information may correspond to the operations of the hands-free second device which may be responsive to the generated simulated audible voice commands. The automated testing tool may output text in an output file comprising one or both of verdict information corresponding to testing the operations of the hands-free second device and all or a portion of the information received from the CAN bus. The text in the test input file may indicate the one or more simulated audible voice commands and one or more expected responses by the hands-free second device. One or more simulated audible voice commands for the testing operations of the hands-free second device may be generated by the automated testing tool based on text to speech logic and may comprise one or more of a specified language, pronunciation, regional accent, volume, pitch and speed. The automated testing tool may compare expected responses from the text in the read test input file to the information received from the CAN bus to determine the verdict information. Furthermore, the first device and the second device may be communicatively coupled via a first mobile phone and a second mobile phone. The automated testing tool may be operable to receive the information from the CAN bus corresponding to a call initiated in the first mobile phone to the second mobile phone by the generated one or more simulated audible voice commands, or a call initiated automatically by the automated testing tool in the second mobile phone to the first mobile phone based on the read test input. Generating one or more simulated audible voice commands may comprise transmitting the simulated audible voice commands from the first device via a speaker positioned to be sensed by a microphone communicatively coupled to the hands-free second device. The hands-free second device may comprise an electronic control unit (ECU) for a vehicle. The operations of the hands-free second device may include communicating messages onto a CAN bus after one or more of receiving an audible voice command via an audio port, reorganizing the voice command and comparing the voice command to a programmed voice grammar. Moreover, the hands-free second device may communicate messages onto the CAN bus after receiving one or more of a command via a wireless interface, a command via an optical interface, and a command via a wire line interface. The first device and the hands free second device may be communicatively coupled by a control area network (CAN) message processor. The automated testing tool may be operable to, one or both of, enable audible voice command operations in the hands-free second device by transmitting a command to the hands-free second device via the CAN message processor, and receive the CAN bus information from the hands-free second device via the CAN message processor.

In a third aspect, still another embodiment of the invention is a non-transitory computer readable medium having stored thereon one or more instructions for testing a hands-free device. The one or more instructions may be executable by one or more processors to cause the one or more processors to perform steps comprising, in an automated testing tool hosted by a first device, reading test input from text in an input file for testing operations of a hands-free second device. The hands-free second device may be communicatively coupled to a control area network (CAN) bus. One or more simulated audible voice commands may be generated for testing operations of the hands-free second device, based on the read test input. The automated testing tool may read information from the CAN bus. The CAN bus information may correspond to the operations of the hands-free second device which may be responsive to the generated simulated audible voice commands. The automated testing tool may output text in an output file comprising one or both of verdict information corresponding to testing the operations of the hands-free second device and all or a portion of the information received from the CAN bus. The text in the test input file may indicate the one or more simulated audible voice commands and one or more expected responses by the hands-free second device. One or more simulated audible voice commands for the testing operations of the hands-free second device may be generated by the automated testing tool based on text to speech logic and may comprise one or more of a specified language, pronunciation, regional accent, volume, pitch and speed. The automated testing tool may compare expected responses from the text in the read test input file to the information received from the CAN bus to determine the verdict information. Furthermore, the first device and the second device may be communicatively coupled via a first mobile phone and a second mobile phone. The automated testing tool may be operable to receive the information from the CAN bus corresponding to a call initiated in the first mobile phone to the second mobile phone by the generated one or more simulated audible voice commands, or a call initiated automatically by the automated testing tool in the second mobile phone to the first mobile phone based on the read test input. Generating one or more simulated audible voice commands may comprise transmitting the simulated audible voice commands from the first device via a speaker positioned to be sensed by a microphone communicatively coupled to the hands-free second device. The hands-free second device may comprise an electronic control unit (ECU) for a vehicle. The operations of the hands-free second device may include communicating messages onto a CAN bus after one or more of receiving an audible voice command via an audio port, reorganizing the voice command and comparing the voice command to a programmed voice grammar. Moreover, the hands-free second device may communicate messages onto the CAN bus after receiving one or more of a command via a wireless interface, a command via an optical interface, and a command via a wire line interface. The first device and the hands free second device may be communicatively coupled by a control area network (CAN) message processor. The automated testing tool may be operable to, one or both of, enable audible voice command operations in the hands-free second device by transmitting a command to the hands-free second device via the CAN message processor, and receive the CAN bus information from the hands-free second device via the CAN message processor.

Now, turning to the figures, FIG. 1 is a representative block diagram of a control area network bus and a plurality of electronic control units communicatively coupled by the control area network bus. Referring to FIG. 1, there is shown a system 100 comprising a control area network (CAN) bus 120 and a plurality of exemplary electronic control units (ECU) including a hands-free module ECU 102, a display ECU 104, a steering ECU 106, a body control ECU 108 and an ECU 110. The ECUs shown in FIG. 1 may be referred to as the ECU devices 102, 104, 106, 108 and 110. Moreover, the ECUs shown in FIG. 1 may be referred to as nodes, modules, units or embedded systems, for example.

The CAN bus 120 may enable the ECU devices 102, 104, 106, 108 and 110 to communicate with each other using a CAN bus message based protocol. In some systems, the CAN bus 120 may utilize a multi-master broadcast serial bus standard for communication among the ECUs. The CAN bus 120 may be utilized in automotive systems, aerospace, industrial automation and medical equipment, for example. One or more CAN standards may be applied to the CAN bus 120, including standards from the Society of Automotive Engineers (SAE) and the international standards organization (ISO). For example, one or more versions or variations of the ISO 11898 standards for serial communication may be utilized. Moreover, CAN bus 120 standards may be utilized in on board diagnostics standards such as OBD-II.

The ECU devices 102, 104, 106, 108 and 110 may comprise embedded systems that control one or more electrical systems or subsystems in a motor vehicle or another type of equipment. For example, the display ECU 104 may control a display screen and/or a corresponding control unit in a vehicular sub-system. The steering ECU 106 may control components in a steering subsystem which may support steering a vehicle and/or other types of controls that may be installed in a steering wheel. The body control ECU 108 may control an air conditioner, wipers, washers, windows, lights, horn, or other sensor and/or control subsystems, for example. Many other types of ECUs (not shown) that may be connected to the CAN bus 120 may include, for example, one or more of an electronic or engine control module (ECM), a powertrain control module (PCM), a transmission control module (TCM), a brake control module (BCM or EBCM), central control module (CCM), central timing module (CTM), general electronic module (GEM), suspension control module (SCM). Some motor vehicles may have on the order of eighty ECUs.

In operation, each of the nodes on the CAN bus 120, including the ECU devices 102, 104, 106, 108 and 110, may be operable to send and/or receive CAN messages serially onto the bus. The messages may each include an identifier. The messages may be sensed by all nodes on the CAN bus 120. In instances when a message is relevant to a node, the node may process the message. In some systems, the CAN bus 120 may utilize a priority based arbitration.

Figure 2:
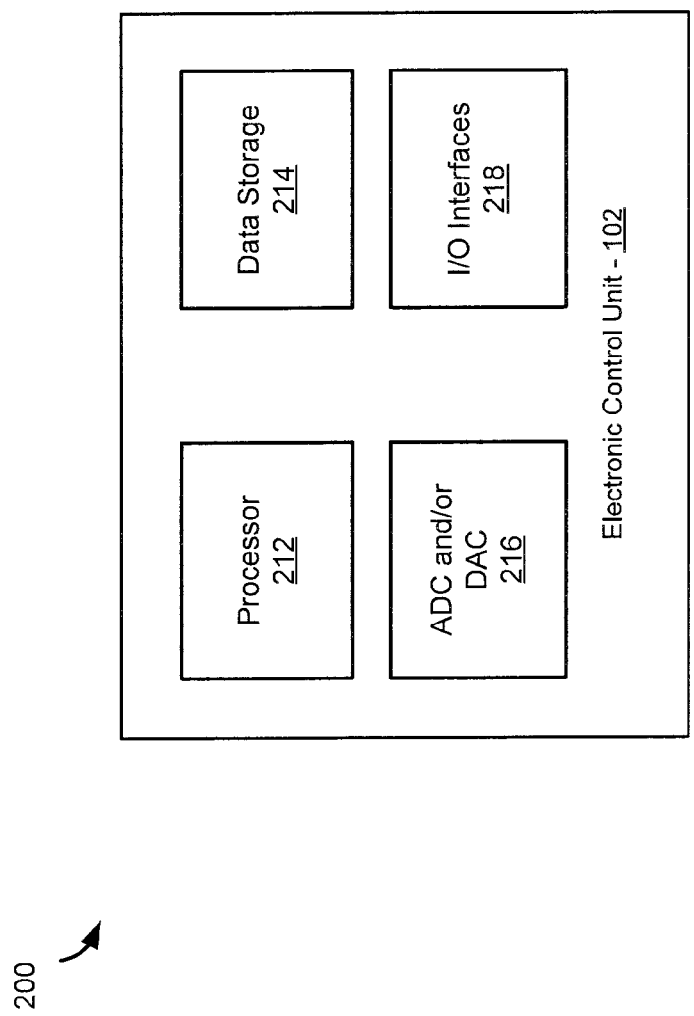
FIG. 2 is a representative block diagram of one embodiment of an electronic control unit which may communicate via a control area network.

FIG. 2 is a representative block diagram of an electronic control unit which may communicate via a control area network. Referring to FIG. 2, the system 200 may comprise the electronic control unit (ECU) 102. The ECU 102 may comprise a processor 212, a memory 214, input and/or output (I/O) interfaces 218 and analog to digital converter and/or a digital to analog converter (ADC/DAC) units 216.

The ECU 102 may be a hands-free module and may be configured to be communicatively coupled to a control area network as described with respect to FIG. 1. The ECU 102 may be an embedded system that may control functions and/or devices of a larger system such as an in-vehicle system or other systems communicatively coupled to a CAN bus. The processor 212 may include one or more processors and may comprise, for example, a microcontroller or digital signal processor. The ECU 102 may be operable to perform analog to digital conversion and/or digital to analog conversion in the ADC/DAC units 216. In some exemplary systems, one or more of the processor 212, the memory 214, the I/O interfaces 218 and/or the ADC/DAC units 216 may include separate integrated circuits. In other exemplary systems, a microcontroller on an integrated circuit in the ECU 102 may include one or more of the processor 212, memory 214, and one or more peripherals such as the I/O interfaces 218 and ADC/DAC units 216. The memory 214 may include RAM and/or ROM memory. The I/O interfaces 218 may include a serial connection to the CAN bus 120, wireless network interfaces, wired network interfaces and in some systems, may include separate audio and/or display interfaces.

In operation, the ECU 102 may comprise a hands-free module that may be operable to communicate via the CAN bus 120 with other ECUs in a vehicle. For example, the hands-free ECU 102 may control, or operate as part of, one or more information and/or entertainment systems in the vehicle. The ECU 102 may accept audible voice commands from a user via a microphone and an audio-in port in the I/O interfaces 218. The ECU 102 may process and/or reorganize the voice command and may compare it against a programmed voice command grammar. The ECU 102 may initiate or control functions of the hands-free module or of other systems or subsystems that are part of the vehicle system or communicatively coupled to a system within the vehicle based on the command. Exemplary systems or subsystems may include a radio, a navigation system, a mobile phone, an emergency warning system, wireless safety communication, automatic driving assistance or other telematics. One or more of the systems or subsystems may have a corresponding display screen that may provide information and/or may provide a menu or indicate a choice of actions that a user may control with a voice command via the hands-free ECU 102. For example, a radio screen 314 (shown in FIG. 3) may indicate a station or programming that is being received and station choices that a user may select with a voice command.

The hands-free ECU 102 may be communicatively coupled via the I/O interfaces 218, to, for example, a display screen, a microphone system, a speaker system or other types of sensors. In instances when the hands-free ECU 102 receives a voice command, the ECU may perform voice reorganization of the voice data and may process the command against a configured list of voice commands. The command may correspond to an action to be taken or activation of a system. The ECU 102 may communicate via the interface 218 on the CAN bus 120, based on the received command. The action to be taken may initiate a change in a display screen and the ECU 102 may transmit a message via the CAN bus 120 that corresponds to the change in display screen. For example, a radio station may be actively playing over a speaker system in the vehicle and a display screen in the vehicle may provide radio station and/or programming information (shown in FIG. 3). The ECU 102 may receive a voice command such as "navigation" or "map" and may communicate via the CAN bus 120 indicating a change in display, from the radio screen to a navigation screen. Similarly, the hands-free module 102 may be communicatively coupled with a mobile phone, for example, via a wireless connection such as Bluetooth connection in the I/O interfaces 218. A user may be listening to the radio and may give a voice command to make a phone call. The ECU 102 may communicate via the CAN bus 120 indicating that a display screen in the vehicle may change to a mobile phone screen and/or corresponding command menus. In another embodiment, the hands free module 102 may communicate with other systems via the CAN bus 120, for example, air conditioning, wiper or light systems. In this regard, the hands-free module 102 may receive an audible voice command for turning-on or adjusting the air conditioning. The hands-free module 102 may process the command and send a message to the display via the CAN bus 120 to change the display with respect to air conditioning controls. Moreover, the hands-free module 102 may send a message to the body control ECU 108 via the CAN bus 120 to activate or adjust the air conditioning in accordance with the voice command.

Figure 3:
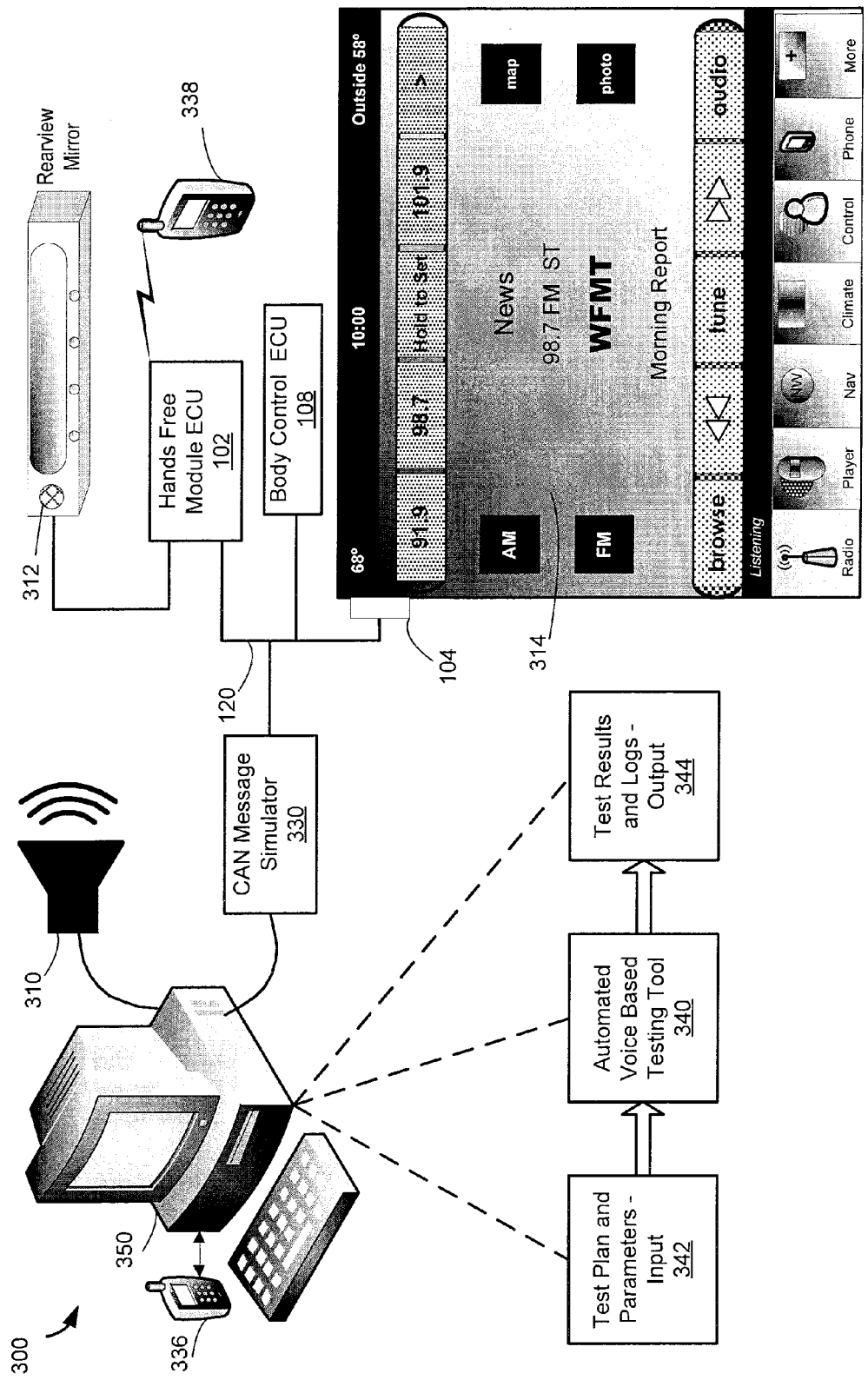
FIG. 3 is a representative diagram of one embodiment of a test set-up for automated testing of an electronic control unit with a control area network connection.

FIG. 3 is a representative diagram of one embodiment of a test set-up for automated testing of an electronic control unit with a control area network connection. Referring to FIG. 3, a testing system 300 may include a test computer 350, a CAN message simulator 330, a test mobile phone 336, a speaker 310, a microphone 312, a mobile phone 338, and a display screen 314. Also shown are the hands-free ECU 102, the display ECU 104, the body control ECU 108 and a CAN bus 120, which are described with respect to FIGS. 1 and 2. In addition, software including an automated test tool 340 is represented with a test plan and test parameter input 342 and a test result and log output 344.

The testing system 300 may be communicatively coupled with a hands-free ECU 102 and a CAN bus 120 which are described with respect to FIGS. 1 and 2. The hands-free ECU 102 and the CAN bus 120 may be tested outside of a vehicular system, for example, in a lab environment or a manufacturing test environment. The hands-free ECU 102 may be tested to ensure that it activates properly and responds correctly to voice commands. The voice commands may be issued to the hands-free ECU 102 in a variety of languages and accents. Also, volume and speed may vary in delivery of the voice commands during the testing procedure.

Simulated voice commands may be communicated to the hands-free ECU 102 via a microphone 312. In a vehicular system, the microphone 312 may be installed in any suitable location such that a user may enter voice commands for the hands-free module ECU 102 system. For example, the microphone 312 may be installed in a rearview mirror, a dashboard unit or a steering wheel unit. The microphone 312 may be connected to the ECU 102 via an audio port to deliver audio signals including the voice commands.

The hands-free ECU 102 may be attached to the CAN bus 120 and may communicate with the display ECU 104 via the CAN bus 120. For example, the hands-free ECU 102 may receive voice commands to perform a specified action such as change a radio station, activate a navigation system, find a driving route or make a phone call, and as a result, the hands-free ECU 102 may communicate via the CAN bus to the display ECU 104 to change the image presented on the display screen 314. In instances when the display screen 314 is changed, the display ECU 104 may communicate screen ID changes to the hands-free ECU 102 via the CAN bus 120 to indicate which screen is being displayed. The screen ID changes communicated from the display ECU 104 to the hands-free ECU 102 may be logged by the automated testing tool 340 to determine whether the hands-free ECU is functioning correctly. The voice command may also trigger a change in the source of information communicated to the display screen 314. For example, the source may be a radio, a navigation system, a mobile phone, various telematics or any suitable device or system communicatively coupled to the hands free system and display 314. In instances when the hands-free ECU 102 does not recognize a voice command, it may inform the display ECU 104 so that the display 314 may indicate to a user that the voice command was not recognized.

In some systems, the hands-free module ECU 102 may be wired to the display unit 314 via VGA and/or LVDS wiring. An audio output port of the hands-free ECU 102 may be coupled to an audio input and/or external speakers of the display 314. Moreover, the ECU 102 may share a power supply with the display 314.

The hands-free ECU 102 may be communicatively coupled to the mobile phone 338, for example, via a wireless connection such as Bluetooth connection in the I/O Interfaces 218. In this regard, the hands-free ECU 102 under test may be operable to control operation of the mobile phone 338 via the wireless connection based on simulated test voice commands received from the automated testing tool 340 via the microphone 312. The hands-free ECU 102 may be operable to signal the mobile phone 338 to initiate a phone call or send a message to a specified phone number, based on a test voice commands. Moreover, in instances when the mobile phone 338 receives a phone call or message from another phone, such as the test phone 336, a simulated voice command may answer the call via the hands-free module. The mobile phone 338 may communicate with the hands-free ECU 102 via an interface of the I/O interfaces 218. The hands-free ECU 102 may communicate screen ID changes to the display ECU 314 via the CAN bus 120 so that information from the mobile phone 338 may be displayed on the display screen 314. In this manner, any information that may be displayed on the mobile phone 338 may be displayed on the hands-free module display 314. U.S. patent application Ser. No. 13/829,949, filed on same date herewith, provides additional information regarding Bluetooth technology that may be utilized in the hands-free ECU 102 and is incorporated herein by reference, in its entirety. Also, action requests that may be input to the mobile phone such as making a call, playing audio and/or video or texting, for example, may be sent to the mobile phone 338 by inputting a voice command to the hands-free module via the microphone 312.

Figure 4:
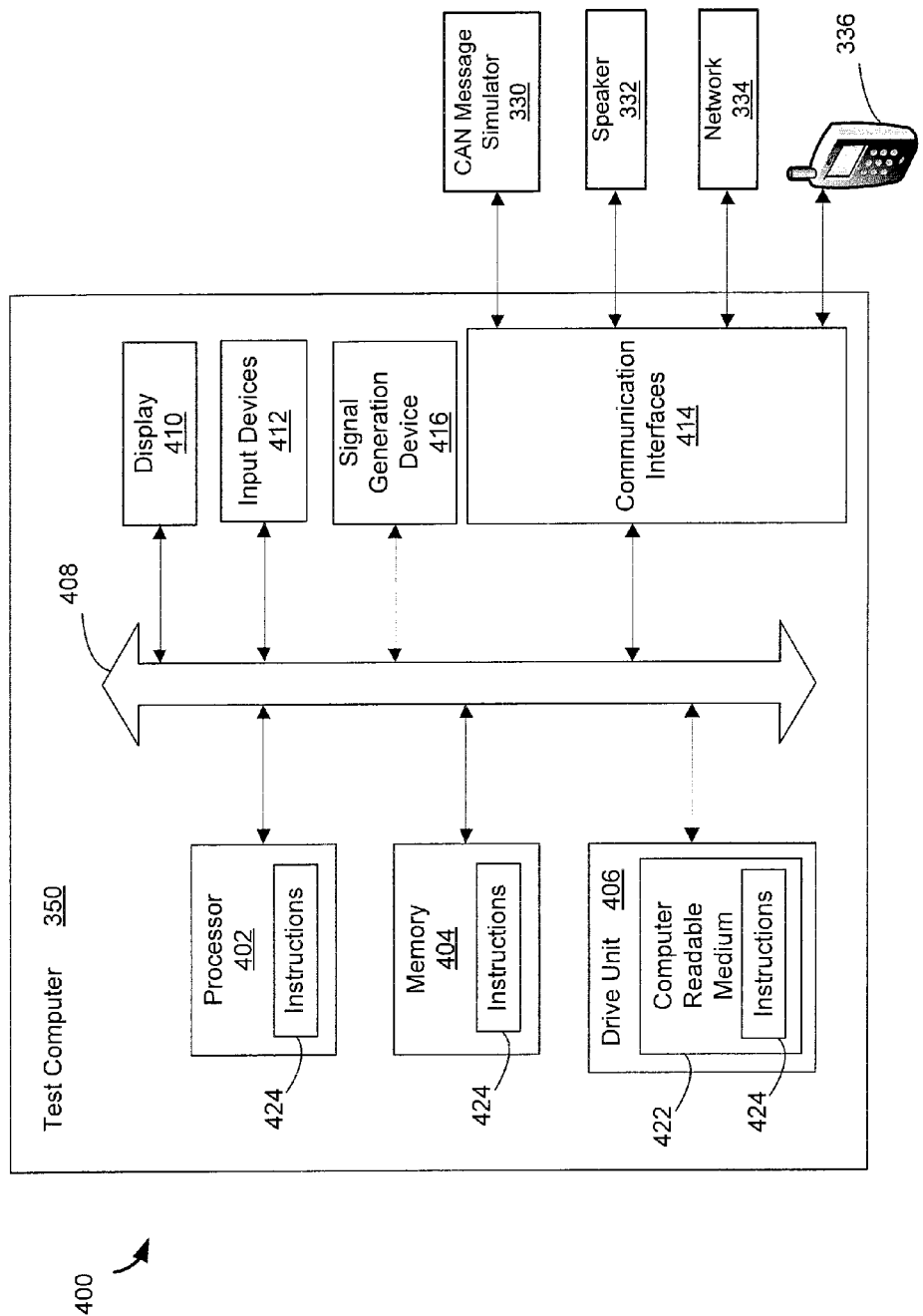
FIG. 4 is a representative block diagram of one embodiment of a test computer that hosts a voice based automated testing tool.

The test computer 350 is described with respect to FIG. 4 and may be, for example, in one embodiment a general purpose computer, or in another embodiment a specially programmed piece of test equipment. The test computer 350 may be communicatively coupled with the speaker 310 or may comprise an integrated speaker 310 that may produce test voice commands that are picked-up by the microphone 312 to test the hands-free module ECU 102. The test computer 350 may be referred to as the computer system 350.

The test computer 350 may send and receive information to the hands-free ECU 102 via the CAN message simulator 330 and the CAN bus 120. The CAN bus message simulator 330 may be referred to as a CAN bus message converter, a CAN bus analyzer or a CAN bus message processor, for example. The test computer 350 may be communicatively coupled with the CAN message simulator 330 via any suitable interface and cable such as an Ethernet cable, USB cable or RS232, for example. Furthermore, any suitable CAN message simulator may be utilized in the test system 300. For example, a Vehicle Spy system from Intrepid Control Systems or a CANoe or a CANlyzer system from Vector may be utilized as the CAN message simulator 330; however, the system is not limited in this regard. Based on a command from the automated testing tool 340, the CAN message simulator 330 may simulate an activation signal to the hands-free ECU 102 that may enable a voice session and the automated voice testing. This may be similar to an in-vehicle system where, for example, a steering wheel may include a hands-free module activation button. When a user depresses the button, a hands-free system activation signal from the steering ECU 106 to the hands-free ECU 102 may be sent via the CAN bus 120 and the hands-free system may begin to accept voice commands and/or may enable voice reorganization in the hands-free ECU 102. The hands-free ECU 102 may send a change screen ID message via the CAN bus 120 to the display ECU 104 and the display screen 314 may be changed to indicate that the voice session is enabled. The sending of a change screen IDs from the hands-free module ECU 102 via the CAN bus 120 may be logged utilized to test operations of the hands-free module ECU 102.

The CAN message simulator 330 may also be operable to receive or trap communication transmitted over the CAN bus 120. In this regard, messages sent to and/or received by the hands-free ECU 102 over the CAN bus 120 may be captured, converted in format and/or analyzed by the CAN message simulator 330 and forwarded to the test computer 350 in a format appropriate format for the test computer 350 and/or the automated test system 340.

The test computer 350 may be operable to store and execute the automated voice based testing tool 340 to test operations of the hands-free module ECU 102 and CAN messages sent via the CAN bus 120. The automated voice based testing tool 340 may be developed in a Labwindows™/CVI development environment, for example. The automated voice based testing tool 340 may call one or more Microsoft speech application interfaces (API) and/or other API's to generate speech by a text to speech engine. The generated speech may be communicated from the test computer 350 via the speaker 310 to the microphone 312 and then to the audio port in the interface 218 of the hands-free ECU 102. The generated speech may be synthesized according to a specified language, a pronunciation of words and phrases and other features of speech such as emphasis and intonation or pitch. The generated speech may be consistent with an intended demographic which may use the hands-free module 102. These qualities of the speech may be indicated to the voice based testing tool 340 by text in a test input file.

The automated voice based testing tool 340 may simulate a voice session with the hands-free module ECU 102 by utilizing text input to generate a desired voice command. A text file, for example, a Microsoft Excel file may be utilized to input one or more of steps for testing the hands-free module ECU 102, input parameters such as words and phrases, expected output parameters such as CAN bus 120 messages and criteria for evaluating test results. The input parameters may include voice commands that may be communicated via one or more of the speaker 310, the microphone 312 and the CAN bus 120 to the hands-free ECU 102. After receiving the simulated voice commands, the hands-free ECU 102 may communicate with the display ECU 104 and/or the display 314 via the CAN bus 120 to perform an action indicated by the simulated voice command.

The test computer 350 may be communicatively coupled with the test mobile phone 336. In some systems, the test computer 350 may communicate with the test mobile phone 336 via a USB port using AT commands or may use a wireless connection. The automated voice based testing tool 340 may be operable to initiate a call by the test mobile phone 336 to the mobile phone 338 and may be operable to answer or receive calls in the test mobile phone 336 from the mobile phone 338. For example, the automated voice based testing tool 340 may send a simulated voice command via the speaker 310 and microphone 312 to the hands-free ECU 102 to initiate a phone call from the mobile phone 338 to the test mobile phone 336. The simulated voice command may trigger messages from the ECU 102 via the CAN bus 120, which may change the display screen 314 to indicate that a call is being made to a specified phone number. These CAN bus 120 messages may be captured by the CAN message simulator 330 and may be sent to the automated voice based testing tool 340 in the test computer 350. The automated voice based testing tool 340 may communicate using AT commands with the test mobile phone 336 to answer the phone call and/or retrieve information that verifies that the phone call was successfully made from the mobile phone 338.

The automated voice based testing tool 340 may utilize AT commands to initiate a call or message from the test mobile phone 336 to the mobile phone 338 and, in some systems, may answer the call by sending a simulated voice message via the speaker 310, the microphone 312 and the hands-free module ECU 102. The hands-free ECU 102 may communicate with the mobile phone 338 via, for example, a Bluetooth connection to answer the call based on the voice command. The hands-free ECU 102 may communicate with the display ECU 104 and/or the display screen 314 via the CAN bus 120 so that the screen 314 may display the incoming call and/or the progression of the phone call. The CAN bus messages may be captured by the CAN message simulator 330 and reported to the automated voice based testing tool 340 which may determine success or failure of the call. The automated voice based testing tool 340 may also utilize communication to and/or from the test phone 336 to determine success and/or failure of communication between the test mobile phone 336 and the mobile phone 338.

The automated voice based testing tool 340 may generate test results data in the test results and log output file 344. The test results may be based on messages communicated over the CAN bus 120 as a result of the simulated voice command and captured by the CAN message simulator 330. In this regard, the CAN message simulator 330 may capture the messages communicated by the hands-free ECU 102 via the CAN bus 120 and may process and/or forward the messages to the test computer 350. The automated voice based testing tool 340 may utilize the CAN bus 120 messages to validate that the simulated voice commands have been successfully recognized by the hands-free module ECU 102. For example, the automated voice based testing tool 340 may extract a screen ID that was captured by the CAN message simulator 330, and compare it to an expected screen ID based on information received in a test input file 342 and/or a corresponding simulated voice command.

An exemplary test result and log output file 344 may comprise a Microsoft Excel file. The test result and log output file 344 may include an input parameter, an expected output parameter, an observed parameter, a verdict such as test pass or fail information and/or remarks. Moreover, the test result and log output file 344 may include detailed logs of the simulated voice commands communicated to the hands-free ECU 102, CAN message traffic captured by the CAN message simulator 330 and/or debugger logs.

In operation, the automated voice based testing tool 340 may automate steps to test the hands-free module ECU 102. Test steps and input parameters may be entered into an Excel test input file. The automated voice based testing tool 340 may be operable to automatically read the test input file and execute the test steps using the input parameters. The automated voice based testing tool 340 may send a message to the CAN message simulator 330 to activate a voice session with a hands-free module ECU 102 via the CAN bus 120. Simulated voice commands which may be of a specified language, a specified accent or pronunciation, a specified rate and/or a specified volume may be communicated from the test PC 350 to the hands-free ECU 102 via the speaker 310 and the microphone 312 by the automated voice based testing tool 340. The hands-free module ECU 102 may understand the simulated audible voice commands and may communicate a screen change message to the display ECU 104 over the CAN bus 120 based on the command. Once the display 314 performs an action on the display screen, for example, displaying a new radio channel, the display ECU 104 may send a CAN message to the hands-free ECU 102 to indicate which screen ID corresponds to the displayed image. The automated voice based testing tool 340 may receive, parse, analyze and/or verify the CAN messages for the screen changes sent via the CAN message simulator 330. The automated voice based testing tool 340 may be operable to simulate mobile phone calls and/or messages by placing and/or receiving phone calls or messages using voice commands to the hands-free ECU 102 and placing and/or receiving phone calls using AT commands to the test mobile phone 336. The automated voice based testing tool 340 may automatically generate a test report that indicates success and/or failure of the hands-free ECU 102 operations based on the captured CAN bus messages and communication with the test phone 336.

FIG. 4 is a block diagram of a computer system that may host the automated voice based testing tool described with respect to FIGS. 1, 2 and 3. The computer system 350 may comprise automated voice based testing tool 340 logic, which, when executed, may cause the computer system 350 to perform any of the logic and/or steps disclosed herein. The computer system 350 may operate as a standalone device or may be connected, for example, using a network or other connection, to other computer systems or peripheral devices. The automated voice based testing tool 340 may be implemented through hardware, software or firmware, or any combination thereof. Alternative software implementations may include, but are not limited to, distributed processing or component/object distributed processing, parallel processing, or virtual machine processing may also be constructed to implement the tools described herein.

In a networked deployment, the computer system 350 may operate in the capacity of a server or as a client user computer in a server-client user network environment, or as a peer computer system in a peer-to-peer (or distributed) network environment. The computer system 350 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing the automated voice based testing tool logic that specifies actions to be taken by that machine. The computer system 350 may comprise electronic devices that provide voice, video or data communication. The system implementation may be a single computer system 350, or may include any collection of systems or sub-systems that individually or jointly execute a set, or multiple sets, of instructions to perform any of the processing for the automated voice based testing tool 340 and communications noted above.

The computer system 350 may include a processor 402, for example, a central processing unit (CPU), a graphics processing unit (GPU), or both. A processor may be implemented as a controller, microprocessor, digital signal processor, microcontroller, application specific integrated circuit (ASIC), discrete logic, or a combination of other types of circuits or logic. Moreover, the computer system 350 may include a memory 404 that can communicate via a bus 408. The memory 404 may be a main memory, a static memory, or a dynamic memory. The memory 404 may include, but may not be limited to internal and/or external computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 404 may include a cache or random access memory for the processor 402. Alternatively or in addition, the memory 404 may be separate from the processor 402, such as a cache memory of a processor, the system memory, or other memory.

The computer system 350 may further include a display 410, such as a liquid crystal display (LCD), an organic light emitting diode (OLED), a flat panel display, a solid state display, or a cathode ray tube (CRT). Additionally, the computer system 350 may include an input device 412, such as a keyboard and/or a cursor control device such as a mouse or any other suitable input device. The computer system 350 may also include a disk drive unit 406, a signal generation device 416, such as a speaker or remote control, and a one or more interfaces devices 414. The one or more interface devices 414 may include any suitable type of interface for wireless, wire line or optical communication between the computer system 350 and another device or network. For example, the computer system 350 may be communicatively coupled with the mobile phone 336, the CAN message simulator 330, the speaker 310 and/or a network via the one or more interface devices 414.

The disk drive unit 406 may include a computer-readable medium 422 in which one or more sets of instructions 424, for example, software, may be embedded. Further, the instructions 424 may embody one or more of the methods and/or logic as described herein for the automated voice based testing tool 340. In a particular embodiment, the instructions 424 may reside completely, or at least partially, within the main memory or static memory 404, and/or within the processor 402 during execution by the computer system 350. The memory 404 and/or the processor 402 also may include computer-readable media.

In general, the automated voice based testing tool 340 logic and processing described above may be encoded and/or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software.

The system may include additional or different logic and may be implemented in many different ways. Memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

Figure 5:
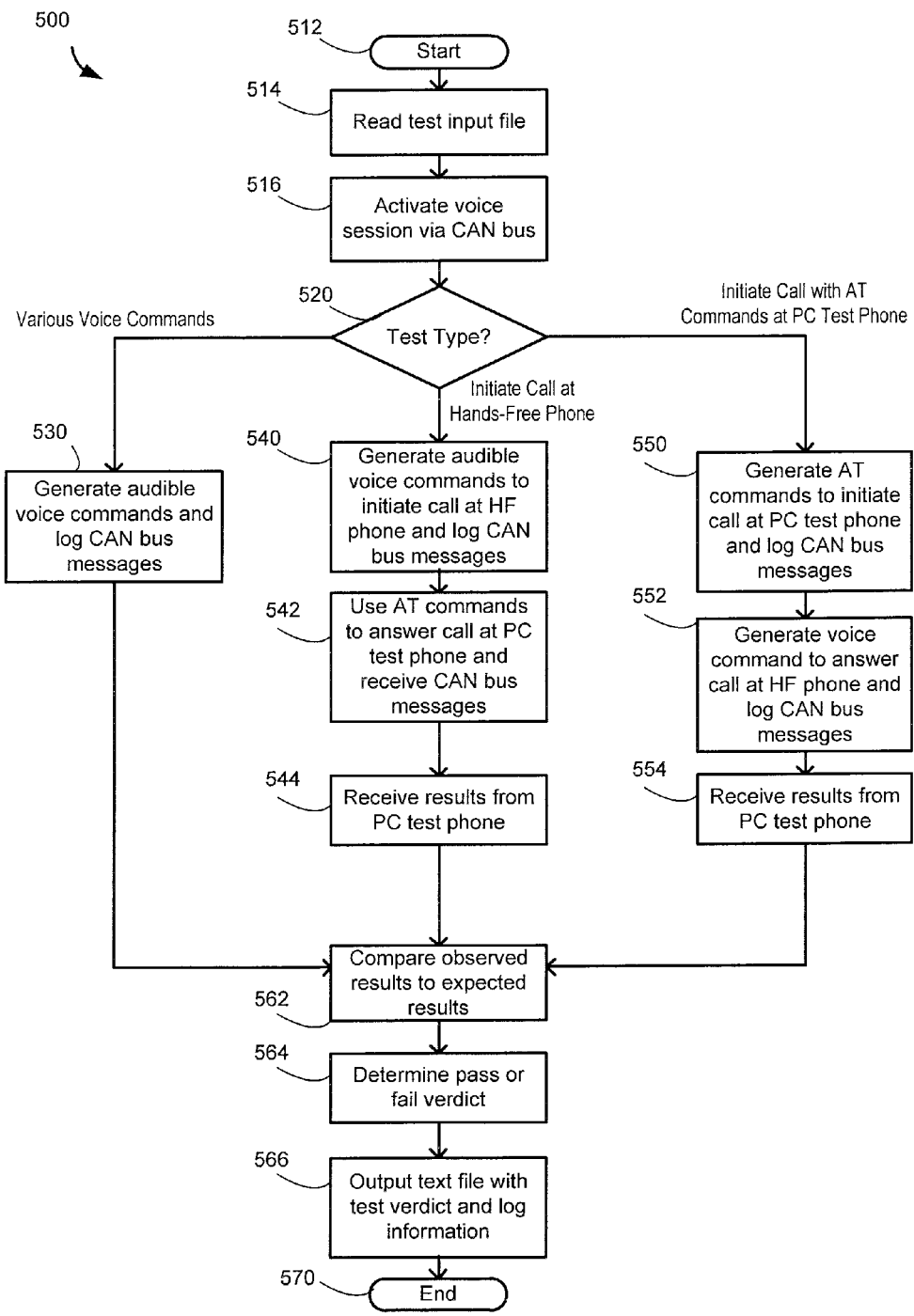
FIG. 5 is a flow chart representing exemplary steps for testing a hands-free voice module using a voice based automated testing tool

FIG. 5 is a flow chart representing exemplary steps for testing a hands-free voice module using a voice based automated testing tool according to an embodiment of the invention. Referring to FIG. 5, the exemplary steps may begin at start step 512. In step 514, the automated voice based testing tool 340 (see FIG. 3) may read the test plan and parameters input file 342. In step 516, the automated voice testing tool 340 may send a command and/or one or more parameters via the CAN message simulator 330 and the CAN bus 120 to the hands-free module ECU 102 to activate a voice session.

In step 520, the automated voice based testing tool 340 may initiate several test modes, such as audible voice commands, and calls to or from a mobile phone. In instances when the automated voice based testing tool 340 tests various voice commands, such as, but not limited to, for example, "play radio," "call 911," "find Route 5" or "turn-on lights," the exemplary steps may proceed to step 530. In step 530, the automated voice based testing tool 340 may generate an audible command via the speaker 310 to the microphone 312 and the hands-free module ECU 102. The automated voice based testing tool 340 may log one or more corresponding CAN bus messages. The corresponding CAN bus messages may be generated by the hands-free module ECU 102 as a result of receiving a command and may be sent to the test computer 350 via the CAN message simulator 330. In some embodiments, the CAN message simulator may create a log file and may forward the log file to the test computer 350.

In step 562, the automated voice based testing tool 340 may compare observed values from the received CAN bus messages or from the test phone 336, to expected values read from the test plan and parameters file 342. In step 564, the automated voice based testing tool 340 may determine whether the hands-free module ECU 102 generated appropriate CAN bus messages relative to commands that were generated by the automated voice based testing tool 340 and may determine one or more test pass or fail verdicts. In step 566, the automated voice based testing tool 340 may write the one or more test pass or fail verdicts and/or the logged CAN bus messages to the test results and logs output file 344. The exemplary steps may end at step 570.

In step 520, in instances when the automated voice based testing tool 340 initiates a call in the mobile phone 338 to the test phone 336, the exemplary steps may proceed to step 540. In step 540 the automated voice based testing tool 340 may generate an audible voice command via the speaker 310 to the microphone 312 and hands-free module ECU 102 to make a phone call or send a message to the test phone 336. The voice command may include a phone number or recipient name, for example. The automated voice based testing tool 340 may log one or more corresponding CAN bus messages that may be generated by the hands-free module ECU 102 and received via the CAN message simulator 330 as a result of the voice command. In step 542, in some systems, the automated voice based testing tool 340 may communicate with the test phone 336 utilizing AT commands and may instruct the test phone 336 to answer the incoming call from the mobile phone 338. The automated voice based testing tool 340 may receive and log CAN bus messages as a result of answering the phone call. In step 544, the automated voice based testing tool 340 may receive information from the test phone 336 as a result receiving and/or answering the call. The exemplary steps may proceed to step 562.

In step 520, in instances when the automated voice based testing tool 340 initiates a call in the test phone 336 to the mobile phone 338, the exemplary steps may proceed to step 550. In step 550, the automated voice based testing tool 340 may send an AT command to the test phone 336 to make a phone call or send a message to the hands-free mobile phone 338. The automated voice based testing tool 340 may log one or more corresponding CAN bus messages that may be generated by the hands-free module ECU 102 and received via the CAN message simulator 330 as a result of the phone call received at the hands free mobile phone 338. In step 552, in some systems, the automated voice based testing tool 340 may generate an audible voice command to answer the incoming call at the mobile phone 338. The automated voice based testing tool 340 may receive and log CAN bus messages as a result of the voice command to answer the phone call. In step 554, the automated voice based testing tool 340 may receive information from the test phone 336 as a result of initiating the phone call and/or as a result of the phone call being answered by the mobile phone 338. The exemplary steps may proceed to step 562.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for testing a hands-free device, the method comprising:
   in an automated voice based testing tool hosted by a first device, said first device communicatively coupled to a speaker and communicatively coupled to a control area network (CAN) bus of a hands-free second device via a CAN message simulator:
      reading text from a test input file, for testing operations of said hands-free second device;
      generating one or more synthesized audible voice commands based on said text read from said test input file for said testing operations of said hands-free second device;
      communicating said one or more synthesized audible voice commands by said first device via said speaker to a microphone coupled to said hands-free second device;
      receiving by said automated testing tool via said CAN message simulator, information from said CAN bus, wherein said CAN bus information corresponds to said operations of said hands-free second device responsive to the generated synthesized audible voice commands; and outputting by said automated testing tool, text in an output file comprising one or both of:
- verdict information corresponding to said testing said operations of said hands-free second device; and
- all or a portion of said information received from said CAN bus.

2. The method of claim 1, wherein said text read from said test input file indicates said one or more synthesized audible voice commands and one or more expected responses by said hands-free second device.

3. The method of claim 1, wherein said one or more synthesized audible voice commands generated based on said text read from said test input file for said testing operations of said hands-free second device are generated by said automated testing tool based on text to speech logic and comprise one or more of a specified:
- language;
- pronunciation;
- regional accent;
- volume;
- pitch; and
- speed.

4. The method of claim 1 further comprising, in said automated testing tool, comparing expected responses from said text in said read test input file to said information received from said CAN bus to determine said verdict information.

5. The method of claim 1, wherein said first device and said second device are communicatively coupled via a first mobile phone and a second mobile phone and said automated testing tool is operable to receive said information from said CAN bus corresponding to:
- a call initiated in said first mobile phone to said second mobile phone by said generated one or more synthesized audible voice commands, or
- a call initiated automatically by said automated testing tool in said second mobile phone to said first mobile phone based on said read test input.

6. The method of claim 1, wherein said generating one or more synthesized audible voice commands comprises transmitting said synthesized audible voice commands from said first device via a speaker positioned to be sensed by a microphone communicatively coupled to said hands-free second device.

7. The method of claim 1, wherein said hands-free second device comprises an electronic control unit (ECU) for a vehicle and said operations of said hands-free second device includes communicating messages onto said CAN bus after one or more of:
- receiving an audible voice command;
- reorganizing said voice command;
- comparing said voice command to a programmed grammar;
- receiving a command via a wireless interface;
- receiving a command via an optical interface; and
- receiving a command via a wire line interface.

8. The method of claim 1, wherein said first device and said hands free second device are communicatively coupled by a control area network (CAN) message processor, and wherein said automated testing tool is operable to, one or both of:
- enable audible voice command operations in said hands-free second device by transmitting a command to said hands-free second device via said CAN message processor; and
- receive said CAN bus information from said hands-free second device via said CAN message processor.

9. A system for testing a hands-free device, the system comprising one or more circuits or processors in a first device, said one or more circuits or processors being operable to:
in an automated voice based testing tool hosted by said first device, said first device communicatively coupled to a speaker and to a control area network (CAN) bus of a hands-free second device via a CAN message simulator:
- read text from a test input file, for testing operations of said hands-free second device;
- generate one or more synthesized audible voice commands based on said text read from said test input file for said testing operations of said hands-free second device;
- communicate said one or more synthesized audible voice commands by said first device via said speaker to a microphone coupled to said hands-free second device;
- receive by said automated testing tool via said CAN message simulator, information from said CAN bus, wherein said CAN bus information corresponds to said operations of said hands-free second device responsive to the generated synthesized audible voice commands; and
- output by said automated testing tool, text in an output file comprising one or both of:
  - verdict information corresponding to said testing said operations of said hands-free second device; and
  - all or a portion of said information received from said CAN bus.

10. The system of claim 9, wherein said text in said test input file indicates said one or more synthesized audible voice commands and one or more expected responses by said hands-free second device.

11. The system of claim 9, wherein said one or more synthesized audible voice commands for said testing operations of said hands-free second device are generated by said automated testing tool based on text to speech logic and comprise one or more of a specified:
- language;
- pronunciation;
- regional accent;
- volume;
- pitch; and
- speed.

12. The system of claim 9, wherein said one or more processors or circuits are operable to:
in said automated testing tool, compare expected responses from said text in said read test input file to said information received from said CAN bus to determine said verdict information.

13. The system of claim 9, wherein said first device and said second device are communicatively coupled via a first mobile phone and a second mobile phone and said automated testing tool is operable to receive said information from said CAN bus corresponding to:
- a call initiated in said first mobile phone to said second mobile phone by said generated one or more synthesized audible voice commands, or
- a call initiated automatically by said automated testing tool in said second mobile phone to said first mobile phone based on said read test input.

14. The system of claim 9, wherein said generating one or more synthesized audible voice commands comprises transmitting said synthesized audible voice commands from said first device via a speaker positioned to be sensed by a microphone communicatively coupled to said hands-free second device.

15. The system of claim 9, wherein said hands-free second device comprises an electronic control unit (ECU) for a vehicle and said operations of said hands-free second device includes communicating messages onto said CAN bus after one or more of:
- receiving an audible voice command;
- reorganizing said voice command;
- comparing said voice command to a programmed grammar;
- receiving a command via a wireless interface;
- receiving a command via an optical interface; and
- receiving a command via a wire line interface.

16. The system of claim 9, wherein said first device and said hands free second device are communicatively coupled by a control area network (CAN) message processor, and wherein said automated testing tool is operable to, one or both of:
- enable audible voice command operations in said hands-free second device by transmitting a command to said hands-free second device via said CAN message processor; and
- receive said CAN bus information from said hands-free second device via said CAN message processor.

17. A non-transitory computer readable medium having stored thereon one or more instructions for testing a hands-free device, said one or more instructions executable by one or more processors to cause the one or more processors to perform steps comprising:
- in an automated voice based testing tool hosted by a first device, said first device communicatively coupled to a speaker and communicatively coupled to a control area network (CAN) bus of a hands-free second device via a CAN message simulator:
  - reading text from a test input file, for testing operations of a hands-free second device;
  - generating one or more synthesized audible voice commands for said testing operations of said hands-free second device based on said text read from said test input file,
  - communicating said one or more synthesized audible voice commands by said first device via said speaker to a microphone coupled to said hands-free second device;
  - receiving by said automated testing tool via said CAN message simulator, information from said CAN bus, wherein said CAN bus information corresponds to said operations of said hands-free second device responsive to the generated synthesized audible voice commands; and
  - outputting by said automated testing tool, text in an output file comprising one or both of:
    - verdict information corresponding to said testing said operations of said hands-free second device; and
    - all or a portion of said information received from said CAN bus.

18. The non-transitory computer readable medium of claim 17, wherein said text in said test input file indicates said one or more synthesized audible voice commands and one or more expected responses by said hands-free second device.

19. The non-transitory computer readable medium of claim 17, wherein said one or more synthesized audible voice commands for said testing operations of said hands-free second device are generated by said automated testing tool based on text to speech logic and comprise one or more of a specified:
- language;
- pronunciation;
- regional accent;
- volume;
- pitch; and
- speed.

20. The non-transitory computer readable medium of claim 17 further comprising, in said automated testing tool, comparing expected responses from said text in said read test input file to said information received from said CAN bus to determine said verdict information.

* * * * *